United States Patent Office 3,508,863
Patented Apr. 28, 1970

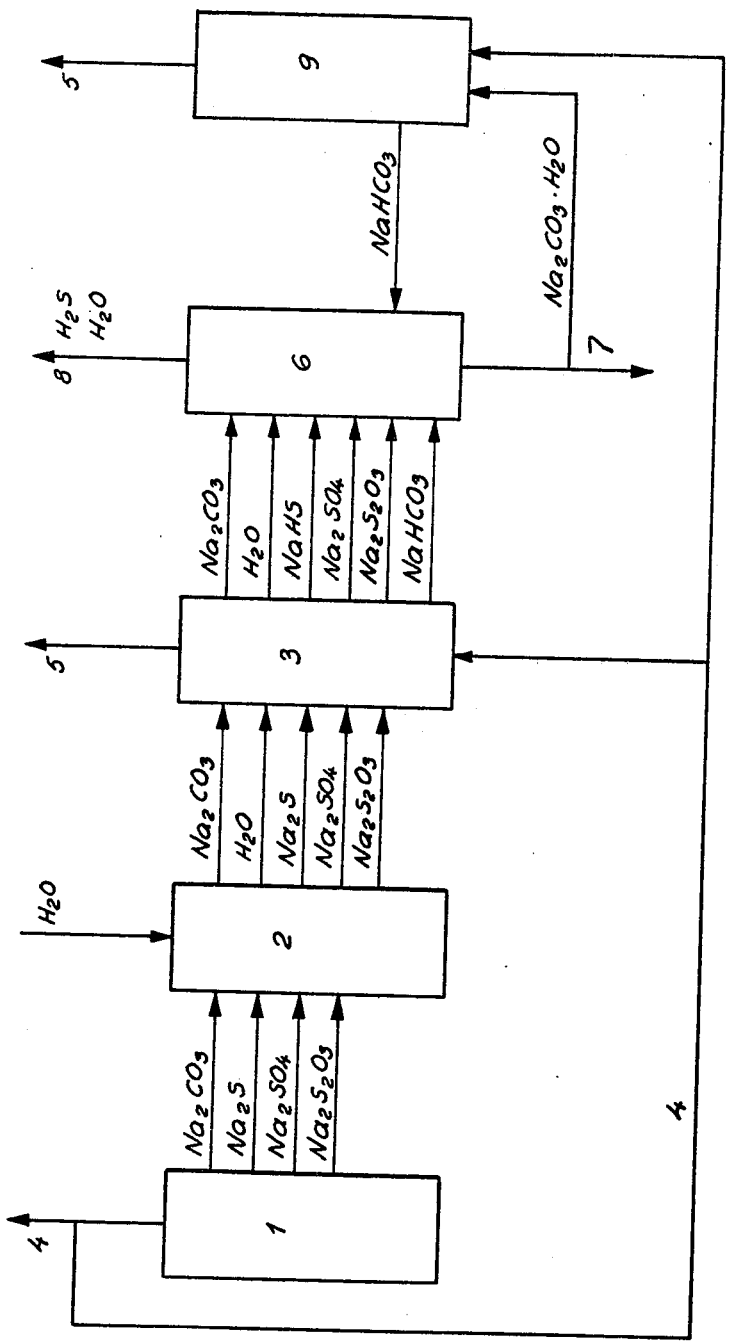

3,508,863
PREPARATION OF SODIUM CARBONATE MONO-HYDRATE FROM SODA SMELT SOLUTION
Keijo R. T. Kiminki and Lauri K. Keskinen, Heinola, Finland, assignors to Oy Tampella Ab, Tampere, Finland, a corporation of Finland
Filed May 19, 1967, Ser. No. 639,873
Claims priority, application Finland, May 25, 1966, 1,370/66
Int. Cl. C01d 7/00
U.S. Cl. 23—63    3 Claims

ABSTRACT OF THE DISCLOSURE

An aqueous smelt solution containing sodium carbonate, sodium sulfide, sodium thiosulphate, and sodium sulfate is pre-carbonated to form sodium bicarbonate in solution which is evaporated in the presence of recycled crystalline sodium bicarbonate to drive off hydrogen sulfide and precipitate sodium carbonate monohydrate.

BACKGROUND OF THE INVENTION

Field of the invention

This invention relates to a method of crystallizing alkali in the form of sulphide- and thiosulphate-free monohydrate crystals from the green liquor solution obtained from burning the spent liquor of cellulose, of removing sulphur in the form of hydrogen sulphide, and of utilizing these substances to prepare fresh cooking liquor.

Description of the prior art

It has been endeavoured by many prior-known methods to convert the alkali and sulphur in green liquor for reuse in preparing cooking liquor. A feature common to most of these methods is that the green liquor is treated in two or more phases with carbon dioxide and/or gases containing carbon dioxide in order to liberate the sulphur in the form of hydrogen sulphide and convert the alkali into hydrogen carbonate.

Technically and economically the most efficient of these methods, at present, is the Sivola method (Finnish Patent No. 27,478), which can be adapted to most sodium-based methods of producing cellulose. In this method, clarified green liquor is pre-carbonated first with a gas containing carbon dioxide and then in the second stage with carbon dioxide itself. The amount of sulphides contained in the solution to be treated after carbonation depends on the quantity of carbon dioxide used. Two possible methods, depending on the purpose or other circumstances, are the following:

(1) Only a part, say two thirds of the sulphur is removed in the form of hydrogen sulphide during carbonation, so that most of the liquid removed after carbonation consists of alkali bicarbonate, both in solution and in the form of a crystal slurry, and undecomposed alkalibisulphited. When this mixture is taken to a decomposer and heated to evaporate part of the water, the alkali bicarbonate and alkali bisulphide react to produce alkali carbonate and hydrogen sulphide, which latter is removed with the vaporized water. Part of the excess bicarbonate is also decomposed into carbonate and carbon dioxide. The final result is an alkali-carbonate solution containing a small quantity of sulphide, and this solution is very suitable for the preparation of NSSC (Neutral sulphite semi-chemical) cooking chemicals, etc.

(2) Nearly all the sulphide is removed during carbonation, so that the liquid obtained after carbonation mostly contains alkali bicarbonate in solution and in crystal-slurry form. The crystallic alkali bicarbonate is filtered off from the mother solution and washed. This produces an alkali that is entirely free of sulphide and thiosulphate, this being necessary for the production of cellulose by any of the sulphite methods. The mother solution can be returned to the dissolver or can be used for other purposes, such as the soda stage of multi-stage cooking.

The Sivola method is technically feasible. Its principal weakness is the high investment cost owing to the large number of stages. Carbonation with carbon dioxide, in particular, raises the investment costs very high. The carbon dioxide requires a gasometer and compressors. The Solvay-type tower employed for carbonation is very expensive. The preparation of the carbon dioxide calls for heat, and this raises operating costs high.

The "Stora" method (TAPPI 43 (1960) 702) resembles the Sivola method as far as carbonation is concerned, and similarly its greatest limiting factors are its high capital and operating costs. The "Mead" method (TAPPI 43 (1960) 699) is restricted to the recovery of NSSC cooking chemicals. It has also been found to create difficulties owing to corrosion and very high amounts of gases to be handled.

The "Rayonier" method (Finnish Patents 32,156; 33,828 and 33,829) is somewhat different. Here, the green liquor is carbonated under pressure to produce a solution containing alkali bicarbonate and alkali bisulphide. When this solution is heated under vacuum, the bicarbonate and bisulphide react to form carbonate and hydrogen sulphide, which is removed with the water vapour. By repeating the carbonation under pressure and decomposition several times, it is possible to convert practically all the alkali sulphide in the green liquor into alkali carbonate and hydrogen sulphide. The method has achieved no commercial application, largely owing to its high heat consumption and the difficulties encountered in designing the equipment and furthermore multitude of steps needed to reach sufficient purity in resulting chemicals.

A disadvantage common to all the above methods is that the alkali carbonate is not obtained completely pure and contains thiosulphate and sulphides. During sulphitation, the latter reacts with the sulphite and thus increases the detrimental thiosulphate content. The only exception is Example 2 of the Sivola method, described above, by which pure alkali bicarbonate crystals are obtained due to the separate washing of these crystals.

SUMMARY OF THE INVENTION

The method according to the present invention offers the following advantages compared with the above prior-known methods:

(1) The number of treatment stages is small.
(2) The alkali-carbonate crystals are free of thiosulphate and sulphide.
(3) It is suitable for all alkali-based cooks, including the one or multistage polysulphide-sulphate cooks.
(4) Its heat economy is advantageous, despite the crystallization evaporation.
(5) It is easy to operate.
(6) Its equipment is simple and inexpensive.
(7) Its space requirements are small.

The principal characteristics of the method according to this invention are that heated smelt solution is expanded together with sodium bicarbonate in such a way that all sulphides are removed as hydrogen sulphide together with water vapour, and that alkali carbonate is removed in monohydrate crystal form the necessary alkali bicarbonate, being added either before or during the expansion stage.

DESCRIPTION OF THE PREFERRED EMBODIMENTS

The invention is described below with reference to the attached drawing, which is a block sheet of the method according to the invention. No. 1 in the drawing is a recovery boiler from which flue gases are exhausted via a conduit 4 and the smelt obtained is taken to a dissolver 2, into which a suitable amount of water is added.

The clarified green liquor, which contains $H_2O$, $Na_2CO_3$, $Na_2S$, $Na_3SO_4$ and $Na_2S_2O_3$, is taken on for precarbonation 3. Precarbonation is performed using the flue gases 4, and the following reactions occur:

(I) $2Na_2S + CO_2 + H_2O \rightleftharpoons 2NaHS + Na_2CO_3$ (pH=10)
(II) $NaHS + CO_2 + H_2O \rightleftharpoons NaHCO_2 + H_2S$ (pH<10)
(III) $H_2S + Na_2S \rightleftharpoons 2NaHS$ (pH>10)

Here, at 3, the reaction conditions are adjusted so that the carbon dioxide is absorbed as completely as possible and reaction I goes entirely from left to right. At the same time hydrogen sulphide is locally liberated in accordance with reaction II. Finally, the gases containing hydrogen sulphide are washed with the still unreacted sulphide solution, whereupon reaction III occurs and most of the hydrogen sulphide is reabsorbed into bisulphide.

The reaction conditions are regulated principally by controlling the incoming quantities of sulphide solution and gases containing carbon dioxide in the correct ratio to each other and by controlling the pH. If desired, automatic control can be applied by continuous pH measurements, but in practice the reaction can be controlled quite satisfactorily with the aid of periodical pH measurements—for instance—once a day. The temperature should be kept within the limits that are advantageous to the reaction, say 25–40° C.

The gases leave the precarbonation stage through the conduit 5, and the precarbonated solution, containing $H_2O$, $Na_2CO_3$, $NaHS$, $NaHCO_3$, $Na_2SO_4$ and $Na_2S_2O_3$, is taken to the evaporator 6, where it is heated by a heat exchanger, for example, and the $H_2O$ and $H_2S$ are expanded and removed from it under vacuum. The latter substances are taken off via the conduit 8 for further treatment of the hydrogen sulphide. To ensure that the crystallic sodium carbonate removed at this stage through conduit 7 is obtained in monohydrate form, the expansion temperature must be kept under 95° C.

Part of the sodium carbonate leaving via 7 is taken in crystal form to the carbonation device 9, where it is dissolved to form a concentrated sodium carbonate solution, which in turn is carbonated by the flue gases 4. The sodium bicarbonate crystals so formed are taken to the evaporation stage 6.

The chemical reaction between precarbonated green liquor and sodium bicarbonate takes place in accordance with the following reaction:

(IV) $NaHCO_3 + NaHS \rightleftharpoons Na_2CO_3 + H_2S$ and the reaction products are removed as described above.

The sodium bicarbonate produced at the precarbonation stage 3 is not sufficient to react with the entire quantity of sulphide. Sodium bicarbonate obtained at the carbonation stage 9 is therefore added at the evaporation stage 6, or in a prior-known manner before it, so as to react with all the sulphide in hydrogensulphide form.

The pure hydrogen sulphide gas and sodium carbonate crystals free of thiosulphate and sulphide are then employed in a prior-known manner for preparing cooking liquor or other purposes.

At the expansion stage 6, solution is removed continuously or periodically and returned to the recovery boiler in order to restrict the accumulation of thiosulphate during stage 6.

EXAMPLE

A test was made in a pilot plant into which was fed green liquor precarbonated at roughly pH 10 according to reactions I and II.

The precarbonated green liquor was conducted into the evaporator continually, to keep the level in this vessel constant. Simultaneously, crystallic sodium-bicarbonate slurry was fed into the evaporator, by means of an adjustable screw feeder in a quantity precisely corresponding to the amount of hydrogen sulphide remaining in the green liquor. As an end result, hydrogen sulphide was liberated in accordance with reaction IV.

The evaporator was at a temperature of 95° C. and a vacuum of 0.55 atmospheres (atm.) produced by a vacuum pump. The active $Na_2O$ concentration in the mother liquor was 208 g./l. throughout the test and its hydrogen sulphide content was 1.05 mol/l. The green liquor, 1 l./min., fed into the evaporator contained 1.43 mol/l. of hydrogen sulphide. The corresponding quantity of bicarbonate was regulated so that the sulphidity of the mother liquor remained constant. The $H_2S$ leaving the chamber was over 80% pure, but since no carbon dioxide was found in the gas, it was possible to raise the $H_2S$ concentration in the gas to almost 100% since the euqipment was tight.

From the lower end of the evaporator, sodium carbonate in monohydrate form was removed in a quantity corresponding to the amount of $Na_2O$ fed in as the green liquor and bicarbonate. The green liquor yielded 154.6 g. and the bicarbonate 44.5 g. of $Na_2O$ per minute. Thus 199.1 g. of carbonate was removed per minute, calculated as $Na_2O$. As stated above, the active $Na_2O$ in the mother liquor remained constant at 208 g. $Na_2O$ per litre. The carbonate removed contained no bicarbonate.

We claim:
1. A method of crystallizing sodium carbonate monohydrate crystals free from sodium thiosulphate and sodium sulphide from the smelt solution arrived at by burning pulping spent liquor, comprising pre-carbonation of heated smelt solution containing sodium thiosulphate and sodium sulphide, with gases containing carbon dioxide to form dissolved sodium bicarbonate evaporation of the pre-carbonated solution together with added sodium bicarbonate to remove all sulphides as hydrogen sulphide together with water vapor to form and recover crystalline sodium carbonate monohydrate.

2. A method according to claim 1, wherein part of the sodium carbonate monohydrate obtained during the evaporation stage is carbonated with gases containing carbon dioxide into sodium bicarbonate which is then taken back to the evaporation stage.

3. A method according to claim 1, wherein part of the solution in the evaporation stage is removed in order to restrict the quantity of thiosulphate.

References Cited

UNITED STATES PATENTS

| | | | |
|---|---|---|---|
| 1,907,987 | 5/1933 | Lynn | 23—63 |
| 2,496,550 | 2/1950 | Larsson et al. | 23—64 |
| 2,864,669 | 12/1958 | Ahlborg et al. | 23—64 X |
| 2,993,753 | 7/1961 | Collins | 23—48 |
| 3,347,739 | 10/1967 | Tomlinson | 162—30 |
| 3,105,738 | 10/1963 | Guerrieri et al. | 23—48 X |

OSCAR R. VERTIZ, Primary Examiner

G. T. OZAKI, Assistant Examiner

U.S. Cl. X.R.

23—48, 49, 64; 162—30